(12) United States Patent
Fairchild

(10) Patent No.: US 6,957,302 B2
(45) Date of Patent: Oct. 18, 2005

(54) SYSTEM AND METHOD FOR PERFORMING WRITE OPERATIONS IN A DISK DRIVE USING A WRITE STACK DRIVE

(75) Inventor: Steven E. Fairchild, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 377 days.

(21) Appl. No.: 09/957,054

(22) Filed: Sep. 20, 2001

(65) Prior Publication Data
US 2003/0053237 A1 Mar. 20, 2003

(51) Int. Cl.[7] .............................. G06F 12/00; G11B 5/09
(52) U.S. Cl. .......................... 711/113; 360/48; 711/114; 711/132; 711/154
(58) Field of Search ..................... 360/48; 711/113–114, 711/154, 132

(56) References Cited

U.S. PATENT DOCUMENTS

| | | | | |
|---|---|---|---|---|
| 5,586,291 A | * | 12/1996 | Lasker et al. ............... | 711/113 |
| 5,590,298 A | * | 12/1996 | Kawamoto ..................... | 711/3 |
| 6,112,277 A | * | 8/2000 | Bui et al. .................... | 711/114 |
| 6,567,889 B1 | * | 5/2003 | DeKoning et al. .......... | 711/114 |

* cited by examiner

Primary Examiner—David Hudspeth
Assistant Examiner—Natalia Figueroa

(57) ABSTRACT

A system and method for performing write operations in a disk drive having a write stack drive is disclosed. The disk drive has two drives, a normal drive and a write stack drive. The write stack receives a write command from an array controller and performs write stack operations to store data from the write operations of the write command. The write stack drive includes a non-volatile stack cache memory comprising tracks to store the data. A metadata file identifies the current data stored within the write stack drive. The normal drive then executes the write operations of the write command.

26 Claims, 3 Drawing Sheets

SYSTEM AND METHOD FOR PERFORMING WRITE OPERATIONS IN A DISK DRIVE USING A WRITE STACK DRIVE

BACKGROUND OF THE INVENTION

1. Field of the Invention

The present invention relates to disk drives and drives to access storage media. More particularly, the present invention relates to disk drive write operations using a write stack operation within the disk drive.

2. Discussion of the Related Art

The write performance of a disk drive may be inefficient where single threaded write operations are being performed. Within known disk drive systems, write operations may incur a command completion time that is proportional to the rotational speed of the disk. For example, a 10,000 rotations per minute ("RPM") drive may take 6 milliseconds minimum to complete a write command. Existing disk drives may attempt to use memory caches to compensate for the write latencies. The memory caches may be on the drive or the array controller.

Memory caches may be effective in reducing write latencies, but they are volatile unless backed up by a battery. Batteries, however, introduce maintenance and disposal issues. Moreover, memory caches may be limited to short term storage during a power outage. Another attempt to compensate for write latencies is to coalesce, or combine, multiple writes to improve response time. This approach may minimize write latency, but not as significantly as a memory cache. Thus, known disk drive systems may suffer from write latencies, or, in the case of memory caches, data loss in the event of power loss. These problems reduce efficiency of the disk drive systems.

SUMMARY OF THE INVENTION

Accordingly, the present invention is directed to a system and method for performing write operations in a disk drive using a write stack drive. Embodiments of the present invention seek to improve the performance of a server disk system by improving the write characteristics of the system. Embodiments of the present invention introduce a special purpose disk drive known as a write stack drive that reduces the latency of a typical disk drive with respect to write commands. The special purpose disk drive is used in combination with a typical disk drive behind an array controller. The resulting combination of the array controller, the write stack drive, and the typical disk drives may result in an improved write response time over known systems.

According to an embodiment, a disk drive system having an array controller that receives a write command from a host is disclosed. The disk drive system includes a write stack drive to receive the write command and to store write operations within the write command with write stack operations on a non-volatile cache memory. The disk drive also includes a normal drive to receive the write command and to execute the write operations within the write command.

According to another embodiment, a disk drive that executes write commands on a storage media coupled to a normal drive is disclosed. The disk drive includes a write stack drive comprising a non-volatile cache memory having a plurality of tracks. The plurality of tracks store data from write stack operations for the write commands. The disk drive also includes a metadata file to identify the data stored within the write stack drive.

According to another embodiment, a system for executing a write command is disclosed. The system includes an array controller coupled to a disk drive. The system also includes a write stack drive within the disk drive to receive the write command. The write stack drive comprises a non-volatile cache stack memory to perform write stack operations for the write command. The system also includes a metadata file to indicated data within the stack memory. The system also includes a normal drive within the disk drive to execute write operations for the write command.

According to another embodiment, a method for executing a write command using a disk drive is disclosed. The method includes receiving the write command at a write stack drive. The method also includes performing write stack operations for write operations within the write command on a non-volatile cache memory within the write stack drive. The method also includes executing the write operations within a normal drive with data stored in the write stack operations.

According to another embodiment, a method for writing data to a disk drive is disclosed. The method includes receiving a write command at an array controller. The method also includes receiving the write command at a write stack drive from the array controller. The method also includes performing write stack operations for the write command on a non-volatile cache memory within the write stack drive. The write stack operations store the data on tracks of the non-volatile cache memory. The method also includes receiving the write command at a normal drive. The method also includes executing write operations at the normal drive with the data. The method also includes indicating to the array controller that the write command is complete.

According to another embodiment, a method for writing data to a normal drive within a disk drive is disclosed. The method includes receiving the data at a write stack drive. The method also includes performing a write stack operation to store the data within a non-volatile cache memory within the write stack drive. The method also includes sending the data to the normal drive.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide further understanding of the invention and are incorporated in and constitute a part of this specification, illustrate embodiments of the present invention, and together with the description, serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
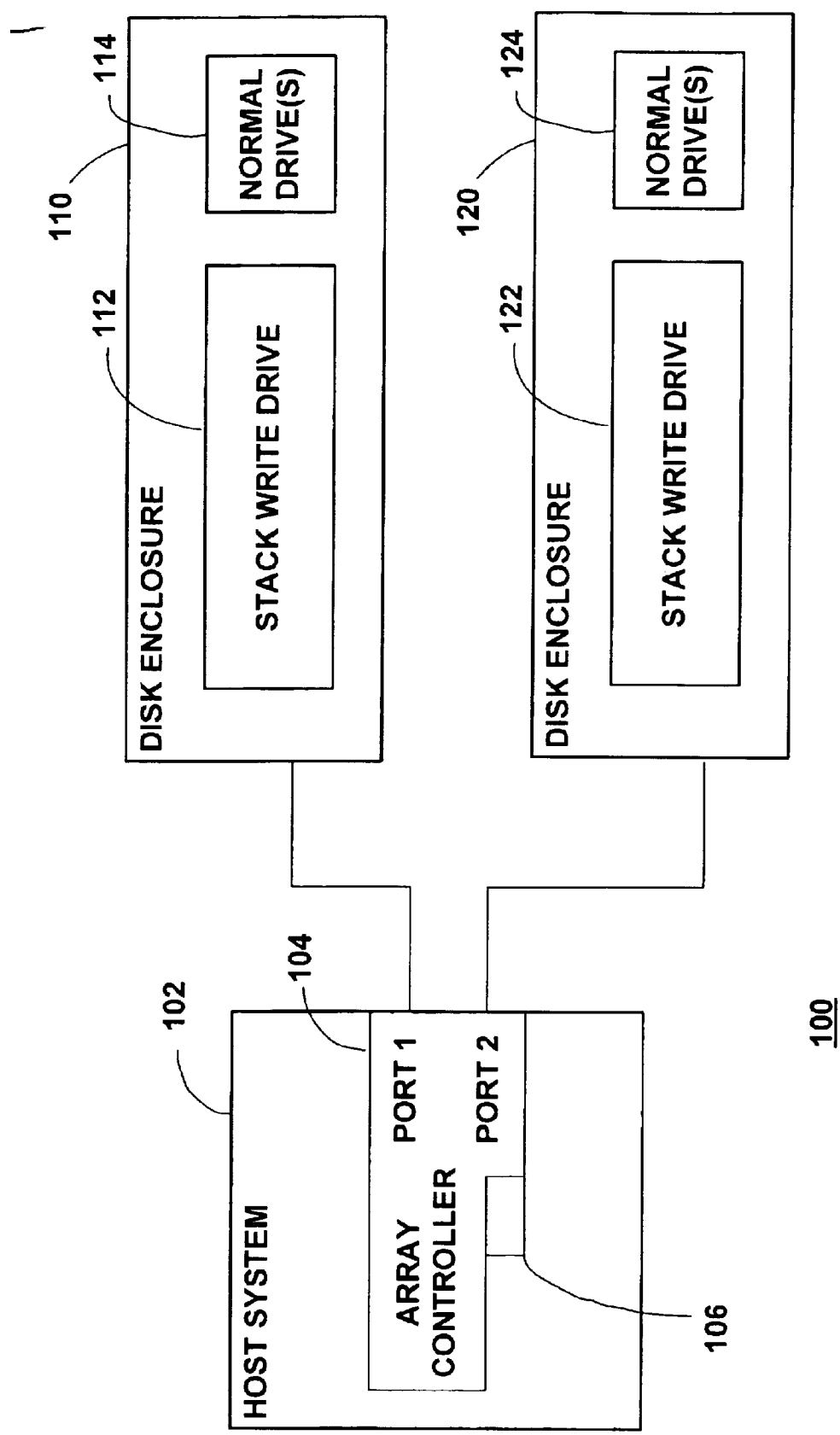
FIG. 1 illustrates a block diagram of a disk drive system in accordance with an embodiment of the present invention.

FIG. 1 depicts a block diagram of a disk drive system 100 in accordance with an embodiment of the present invention. Disk drive system 100 may write and read information onto magnetic disks. Alternatively, disk drive system 100 may write and read information onto any storage media. Disk drive system 100 includes host system 102. Host system 102 is the component interested in writing and reading from the storage media. Preferably, host system 102 is a computer. Alternatively, host system 102 is any component capable of processing instructions, storing data in memory or executing programs. Typically, host system 102 will receive read and write instructions from a program, user, another computer, and the like.

Host system 102 uses array controller 104 to perform operations on disk drives attached to array controller 104. Array controller 104 includes ports to couple to the disk drives. Array controller 104 receives commands from host system 102 to write or read information. Using the ports coupled to the attached disk drives, array controller 104 may perform operations on the disk drives and have the disk drives execute the commands from host system 102.

According to the disclosed embodiments, disk drives 110 and 120 are coupled to array controller 104. Disk drives 110 and 120 may be coupled to array controller 104 by any platform capable of exchanging data, such as cables, wires, infrared beams, and the like. Preferably, disk drives 110 and 120 are within a server that stores information from host system 102. The server may store information from more than one host system within a network. A plurality of array controllers, therefore, may be coupled to disk drives 110 and 120.

Disk drive 110 includes stack write drive 112 and normal drive 114. Normal drive 114 may be a plurality of drives within disk drive 110. Stack write drive 112 is between array controller 104 and normal drive 114, and may act as an intermediary for the two components. Disk drive 120 includes stack write drive 122 and normal drive 124. Normal drive 124 also may be a plurality of drives within disk drive 120. Stack write drive 122 is between array controller 104 and normal drive 124, and may act as an intermediary for the two components.

Write commands from host system 102 may vary in size. The write commands may be blocks of instructions enacting write operations for disk drives 110 and 120. Write operations in the write commands may be single threaded in nature. Array controller 104 receives the write command, and commits the data within the command to a least recently used ("LRU") cache 106. Data may be read from LRU cache 106. This cache operation allows a quick response to subsequent read operations to the same block of data.

Array controller 104 sends the write command and its accompanying data to write stack drives 112 and 122. Write stack drives 112 and 122 are non-volatile cache memories that store the data from the write commands. Write stack drives 112 and 122 help coordinate write commands from array controller 104 to normal drives 114 and 124. The cache memories act as stack memories to store the data. Thus, each write command is treated as a write stack operation. For example, a track within write stack drive 112 will hold the results of a single write operation. This storage may be independent of the actual logical block address. By storing write commands as write stack operations within write stack drive 112, the latency incurred on a write operation may be reduced, essentially becoming a factor of the servo and write capabilities of disk drive 110.

Normal drive 114 is free to complete the write operations in a background mode with low priority because write stack drive 112 has preserved the data. If the write access pattern is sequential, as in a log file, then the write cache on normal drive 114 may allow normal drive 114 to quickly commit the data to a disk within disk drive 110, which may reduce the need for an excessively large write stack drive 112. For example, normal drive 114 may be "write caching enabled" to allow write stack drive 112 to be used in mirroring write operations within disk drive 110. Array controller 104 would use a command complete response from write stack drive 112 to indicate a completed command to host system 102. If write caching is not enabled, the command complete response would come from normal drive 114.

Figure 2:
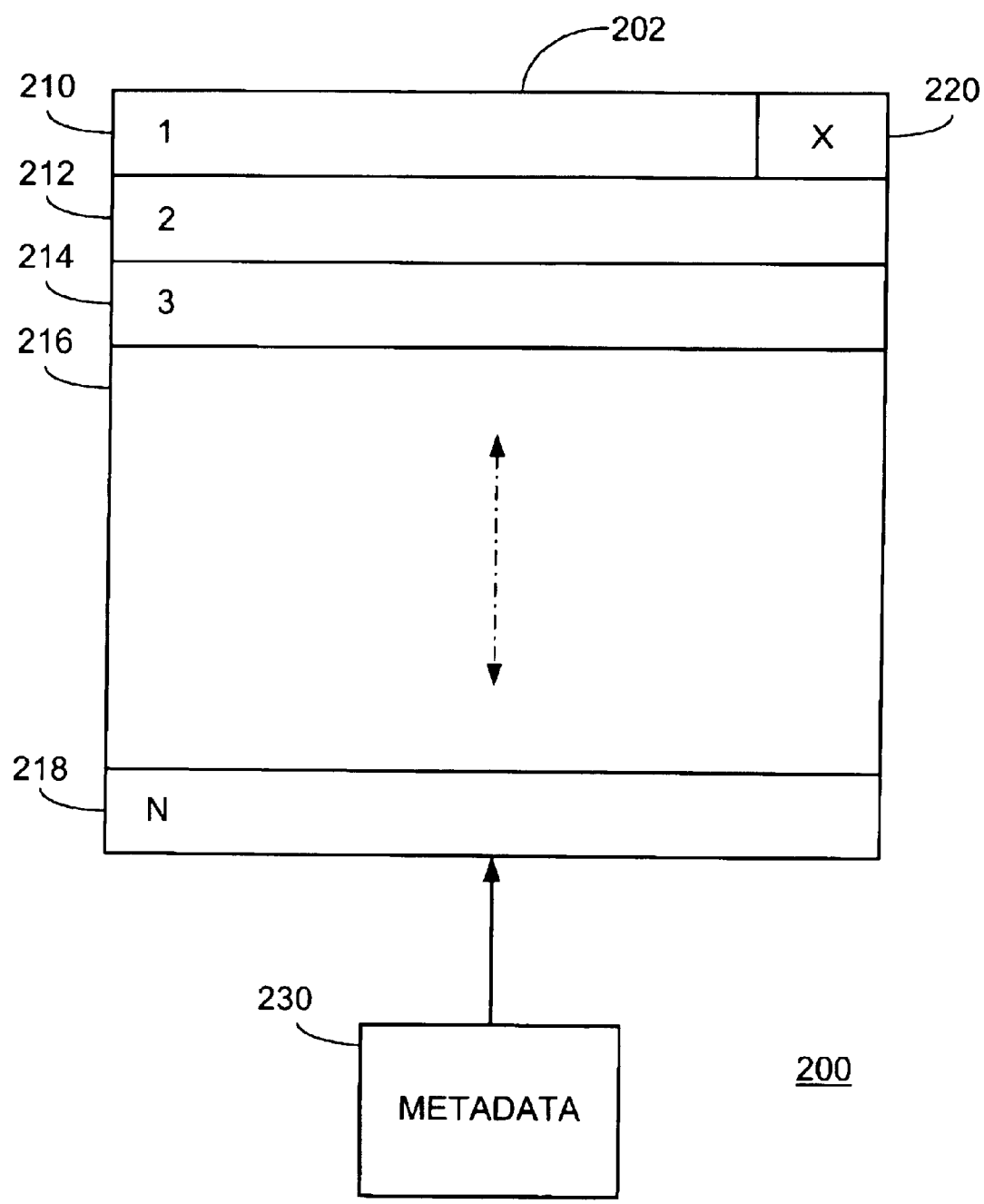
FIG. 2 illustrates a block diagram of a write stack drive in accordance with an embodiment of the present invention.

FIG. 2 depicts a block diagram of a write stack drive 200 in accordance with an embodiment of the present invention. Write stack drive 200 corresponds with write stack drives 112 and 122 of FIG. 1. Write stack drive 200 includes stack cache memory 202. Stack cache memory 202 comprises tracks for storing write operations, as disclosed above. Each track within stack cache memory 202 may store one write operation. As depicted in FIG. 2, tracks 210, 212, 214, 216 and 218 may store data from the write operations. Track 210 may have an address of 1, track 212 may have an address of 2, and so on. Tracks 216 may represent a plurality of tracks within stack cache memory 202. Track 218 may be the Nth track within stack cache memory 202.

As disclosed above, a write operation results in a write stack operation on stack cache memory 202. A single track, such as track 210, will hold the results of the single write operation. Thus, stack cache memory 202 acts as a non-volatile write cache that may be mirrored for fault tolerance. Write stack drive 200, however, may not be effective for read operations. As disclosed above, the most effective use of write stack drive 200 would be for write operations in conjunction with a normal drive behind an array controller.

After write stack drive 200 writes the data, stack cache memory 202 positions a pointer to the next track. The choice of track may depend on the fastest track access method, seek or head switch. For example, if track 210 was just written to, then stack cache memory 202 may point to track 212. The write stack drive 200 also may optimize the write method in the event of a write inhibit by allowing additional settle time and trying again at the first available sector.

A marker sector may be written at the end of a write operation to indicate those sectors on the track that contain valid data. This action may avoid revolution hits on write errors to ensure optimal performance. For example, track 210 may store a write operation that has a marker sector 220 that indicates those sectors on track 210 that are valid. Further, marker sector 220 may have a flag indicating the validity of the data on track 210.

Write stack drive 200 also includes a metadata file 230. Metadata file 230 is desirable in case a read of recently written data occurs. A situation where this action may be possible is when the array controller LRU cache, such as LRU cache 106 in FIG. 1, has flushed the desired data and some sort of fault has occurred on the normal drive.

Preferably, to keep the write performance in disk drive system 100 optimal, array controller 104 may perform reads only to a normal drive, such as normal drive 114. An instance where the read would not be from normal drive 114 is when normal drive 114 has failed. To maintain maximum fault tolerance, array controller 104 may be configured with mirrored sets of write stack drives and normal drives to have the data available in case of failure on one of the normal drives.

Unlike a software stack, when stack cache memory 202 has reached the end of the tracks on the media, or track 218, then stack cache memory 202 may wrap itself around and overwrite earlier data. For example, stack cache memory 202 would wrap around to track 210. Metadata file 230 would reflect the data currently available on stack cache memory 202. In an unexpected power off condition, the metadata of metadata file 230 would be available to "rebuild" the lost write cache data on the normal drive, such as normal drive 114. The speed of the rebuild may be based on coordinating the metadata from write stack drive 200, the array controller and the normal drive.

The effectiveness of write stack drive 200 may be tied to the number of tracks available, as opposed to rotations per minute or access times. Thus, write stack drive 200 may be slower than normal drives within a disk drive system. A slower drive may result in a higher tracks per inch because of servo bandwidth margin. There also is the possibility of using a drive with increased platter counts to allow a greater ratio of head switch to single track seeks, which may be another potential performance increase.

If the disk drive system works properly, the data written to write stack drive 200 is never read, and becomes a write only device designed to allow a fast command complete to occur. The resulting combination of an array controller, a write stack drive, and a normal drive should result in a write response time that is about two to six times faster than a system without the write stack drive. The write latency may be reduced to about 1 millisecond, though actual response time may be dependent on the single track seek or head switch speeds of the disk drive used.

Figure 3:
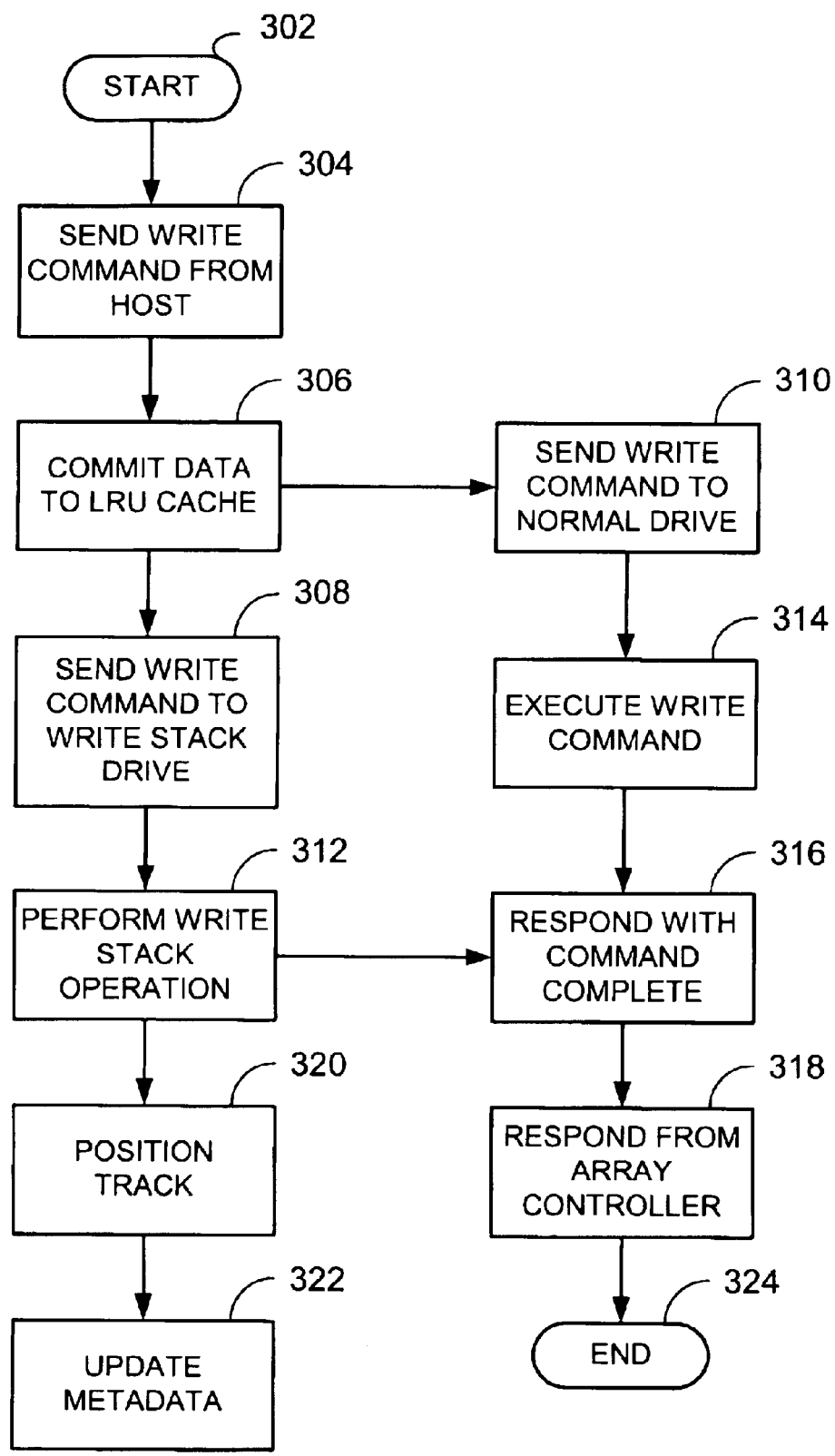
FIG. 3 shows a flowchart for executing a write command in accordance with an embodiment of the present invention.

FIG. 3 depicts a flowchart for executing a write command in accordance with an embodiment of the present invention. Step 302 executes by starting the process for executing a write command. Step 304 executes by sending a write command from a host system to an array controller. The write command may be a result of an instruction or request from a computer program or user interface on the host system. Step 306 executes by committing data from the write command to the LRU cache within the array controller.

Step 308 executes by sending the write command to a write stack drive within a disk drive. Step 310 executes by sending the write command to a normal drive within the disk drive. Thus, the array controller sends the write command to both drives on the disk drive. Step 312 executes by performing a write stack operation on a non-volatile cache memory within the write stack drive. The write stack operation includes storing data from the write operations within the write command on the tracks of the non-volatile memory. Step 314 executes by executing the write command at the normal drive. As with the write stack drive, the normal drive stores the data from the write operations of the write command.

As each drive completes the write command, step 316 executes by responding to the array controller that the write command is complete. Preferably, the write stack drive will complete the write stack operations before the normal drive, and the command complete will be sent to the array controller when the write stack drive indicates command complete. The normal drive also may indicate command complete, either to the write stack drive or the array controller. Step 318 executes by responding from the array controller to the host system that the command is complete. By not waiting for the normal drive, the array controller may respond to the host system in a faster manner, and write commands may be performed quickly.

Step 320 executes by positioning the pointer for the non-volatile cache memory to the next track for the next write operation. Step 322 executes by updating the metadata file that valid data is within sectors on the track. Steps 320 and 322 are not dependent upon the completion of step 312, and may run concurrently with step 312. Preferably, step 312 will move to step 316 when all write stack operations are complete.

Thus, a system and method for executing write commands in a disk drive using a write stack drive is disclosed. According to the following example, a computer program requests that data be written onto a magnetic storage media within a disk drive. The disk drive is attached to the computer running the computer program. An array controller manages information between the disk drive and the computer, and sends the write command to the disk drive. Other disk drives may be attached to the computer through the array controller.

The write command is received at a write stack drive and normal drive within the disk drive. The write stack drive includes a non-volatile stack cache memory that stores the write operations on tracks. Because the memory is non-volatile, the data will not be lost in the event of power loss. The normal drive executes the write command and writes the data onto a disk. The write stack drive mirrors the write command results of the normal drive. However, because write stack drive includes a cache memory, it may complete its write command faster than the normal drive. After command completion, the write stack drive sends a command complete to the array controller. The array controller then sends a command complete to the computer program. Thus, the computer program indicates the write command has been completed in a quicker manner than typical write command operations. The computer program is not dependent on the speed of the normal drive in performing writes.

It will be apparent to those skilled in the art that various modifications and variations can be made in the disclosed embodiments of the present invention without departing from the spirit or scope of the invention. Thus, it is intended that the present invention covers the modifications and variations of this invention provided that they come within the scope of any claims and their equivalents.

What is claimed is:

1. A disk drive system having an array controller that receives a write command from a host, comprising:

a write stack drive to receive said write command and to store write operations within said write command with write stack operations on a non-volatile cache memory which acts as a stack memory; and a normal drive to receive said write command and to execute said write operations within said write command.

2. The disk drive system of claim 1, wherein said write command stores data in a storage media.

3. The disk drive system of claim 1, wherein said non-volatile cache memory comprises a plurality of tracks.

4. The disk drive system of claim 1, wherein said write stack drive sends a complete command when said write stack operations are completed.

5. The disk drive system of claim 1, wherein said write stack drive comprises metadata to reflect data within said write stack drive.

6. A disk drive that executes write commands on a storage media coupled to a normal drive, comprising:

a write stack drive comprising a non-volatile cache stack memory having a plurality of tracks, wherein said plurality of tracks store data from write stack operations for said write commands; and a metadata file to identify the data stored within said write stack drive.

7. The disk drive of claim 6, wherein said write stack drive mirrors said normal drive.

8. The disk drive of claim 6, further comprising a marker sector for each write stack operation stored within said write stack drive.

9. The disk drive of claim said marker sector includes a valid data flag.

10. The disk drive of claim 6, wherein said write commands are received from an array controller coupled to said disk drive.

11. A system for executing a write command, comprising:
an array controller coupled to a disk drive;
a write stack drive within said disk drive to receive said write command, wherein said write stack drive comprises a non-volatile cache stack memory to perform write stack operations for said write command;
a metadata file to indicate data within, said stack memory; and
a normal drive within said disk drive to execute write operations for said write command.

12. The system of claim 11, wherein said stack memory comprises line tracks.

13. The system of claim 11, further comprising a host to initiate said write command to said array controller.

14. The system of claim 11, wherein said write stack operations include marker sectors.

15. A method for executing a write command using a disk drive, comprising:
receiving said write command at a write stack drive;
performing write stack operations for write operations within said write command on a non-volatile cache memory within said write stack drive;
executing said write operations within a normal drive with data stored in said write stack operations; and,
responding with a command complete upon completion of said write stack operations.

16. The method of claim 15, wherein said responding comprises sending said command from said write stack.

17. The method of claim 15, further comprising receiving said write command from an array controller.

18. The method of claim 15, further comprising updating a metadata file when said write stack operations are performed.

19. The method of claim 15, wherein said performing comprises writing data from said write command to a line track within said cache memory.

20. The method of claim 19, further comprising positioning a pointer to another track when said writing is completed.

21. A method for writing data to a disk drive, comprising:
receiving a write command at an array controller;
receiving said write command at a write stack drive from said array controller;
performing write stack operations for said write command on a non-volatile cache memory with said write stack drive, wherein said write stack operations store said data on tracks of said non-volatile cache memory;
receiving said write command at a normal drive;
executing write operations at said normal drive with said data; and
indicating from said write stack drive to said array controller that said write command is complete.

22. The method of claim 21, further comprising positioning a line track within said write stack drive.

23. The method of claim 21, further comprising updating a metadata file that indicates current data within said write stack drive.

24. A method for writing data to a normal drive within a disk drive, comprising:
receiving said data at a write stack drive;
performing a write stack operation to store said data within a non-volatile cache memory within said write stack drive;
sending said data to said normal drive; and,
committing said data to an LRU cache.

25. The method of claim 24, further comprising executing said write command at said normal drive.

26. The method of claim 24, further comprising receiving said data at said normal drive.

* * * * *